UNITED STATES PATENT OFFICE.

CARL WEGENER, OF MOSCOW, RUSSIA, ASSIGNOR OF ONE-HALF TO PHILIPP ROSENTHAL, OF SAME PLACE.

METHOD OF PROVIDING METALLIC MIRRORS WITH IMAGES.

SPECIFICATION forming part of Letters Patent No. 421,119, dated February 11, 1890.

Application filed August 1, 1889. Serial No. 319,450. (No specimens.)

*To all whom it may concern:*

Be it known that I, CARL WEGENER, a subject of the King of Prussia, residing at Moscow, in the Empire of Russia, have invented a new and useful method of providing metallic mirrors with images, signs, or other devices, which will be ordinarily invisible, but will become visible on another surface by means of reflected luminous rays directed thereupon from said mirror, of which the following is a specification.

My invention consists in a method of providing metallic mirrors with images, signs, or the like, which are ordinarily invisible and do not affect the use of the mirror; but when the mirror is exposed to the light and luminous rays are reflected therefrom on a surface or an object said image, sign, or the like will appear on said surface or object. The mirror may also be used as an ordinary mirror.

The mirror is constructed as follows: Any kind of metal may be used, such as iron or steel or other suitable metal, and the desired plane or curved form may be given to the mirror. The surface of the mirror is then hardened and polished. The polished surface of the mirror is then provided with an embossed or deepened image, sign, or the like, and the surface of the mirror is again polished to such a degree that in looking in the mirror the image will be no longer visible and the ordinary use and appearance of the mirror will not be prejudicially influenced. By the alteration of the structure of the metal in the second polishing the image becomes invisible; but when it is exposed to the light and reflected on another surface the image, figure, or character will appear on said other surface or object.

The images may be produced on the polished metal mirror by etching, engraving, pressing, or in any other suitable way, for the execution of which use may be made of a sand-blast engine, a graver, a press-stamp, or other suitable means. By this second grinding and subsequent polishing, or by any other operation usually employed for polishing metallic objects, the image is made invisible to such a degree that it will not prejudicially influence the mirror in appearance or for its ordinary use, and will be formed on another surface than that of the mirror only when the luminous rays are reflected by the mirror on the said surface.

Having thus described my invention, what I claim as new, and desire to secure by Letters Patent, is—

The method of providing metallic mirrors with invisible images, signs, or other devices capable of being rendered visible on another surface or object by reflected luminous rays from the mirror, which consists in forming an image or other device on the polished surface of a metallic mirror by etching, engraving, pressing, or otherwise, and rendering the image invisible by grinding and burnishing the polished surface of the mirror, substantially as set forth.

In testimony whereof I have signed my name to this specification in the presence of two subscribing witnesses.

CARL WEGENER.

Witnesses:
   F. VON VERREN,
   G. HÜLSMANN.